United States Patent
Puri et al.

(10) Patent No.: US 10,000,214 B2
(45) Date of Patent: Jun. 19, 2018

(54) VEHICLE CONTROLS INCLUDING DYNAMIC VEHICLE PARAMETER DETERMINATION

(71) Applicant: Cummins In., Columbus, IN (US)

(72) Inventors: Anant Puri, Columbus, IN (US); Pinak J. Tulpule, Columbus, IN (US); Vivek A. Sujan, Columbus, IN (US); Kenneth Follen, Greenwood, IN (US)

(73) Assignee: Cummins Inc., Columbus, IN (US)

(*) Notice: Subject to any disclaimer, the term of this patent is extended or adjusted under 35 U.S.C. 154(b) by 261 days.

(21) Appl. No.: 14/976,717

(22) Filed: Dec. 21, 2015

(65) Prior Publication Data

US 2017/0174216 A1    Jun. 22, 2017

(51) Int. Cl.
  *B60W 30/188*    (2012.01)
  *B60W 40/076*    (2012.01)
  *B60W 40/12*     (2012.01)
  *B60W 50/00*     (2006.01)

(52) U.S. Cl.
  CPC ........ *B60W 30/188* (2013.01); *B60W 40/076* (2013.01); *B60W 40/12* (2013.01); *B60W 50/0097* (2013.01); *B60W 2510/085* (2013.01); *B60W 2550/142* (2013.01); *B60W 2710/0644* (2013.01); *B60W 2710/0666* (2013.01); *B60W 2710/0677* (2013.01)

(58) Field of Classification Search
None
See application file for complete search history.

(56) References Cited

U.S. PATENT DOCUMENTS

| | | |
|---|---|---|
| 4,134,291 A | 1/1979 | Gregoire |
| 7,324,888 B1 | 1/2008 | Stotsky |
| 7,377,180 B2 | 5/2008 | Cunningham |
| 7,493,206 B2 | 2/2009 | Lahti et al. |
| 8,452,509 B2 | 5/2013 | Sujan et al. |
| 8,554,441 B1 | 10/2013 | Johansson et al. |
| 8,744,718 B2 | 6/2014 | Johansson et al. |

(Continued)

FOREIGN PATENT DOCUMENTS

| | | |
|---|---|---|
| EP | 1215071 | 6/2002 |
| GB | 2489777 | 10/2012 |
| GB | 2489824 | 10/2012 |

*Primary Examiner* — Jacob S. Scott
(74) *Attorney, Agent, or Firm* — Taft Stettinius & Hollister LLP (57) ABSTRACT

Apparatuses, methods, systems and controls including dynamic vehicle parameter determination are disclosed. One embodiment is a method of operating a vehicle system including a powertrain comprising a prime mover structured to propel the vehicle, and an electronic control system in operative communication with the prime mover and the transmission. The method includes estimating a plurality of coefficients of a vehicle loss model, evaluating a convergence criterion for the plurality of estimated coefficients, setting converged values of the plurality of coefficients if the convergence criterion is satisfied, determining a vehicle powertrain command utilizing the converged values of the plurality of coefficients, and transmitting a vehicle powertrain command to control operation of one or more powertrain components.

20 Claims, 4 Drawing Sheets

(56) References Cited

U.S. PATENT DOCUMENTS

| | | |
|---|---|---|
| 8,751,087 B1 * | 6/2014 | Dufford ................ B60K 6/445 180/65.23 |
| 8,849,528 B2 | 9/2014 | Palmer |
| 2009/0006007 A1 | 1/2009 | Greiner et al. |
| 2012/0197501 A1 | 8/2012 | Sujan et al. |
| 2013/0054143 A1 | 2/2013 | DeGolier |
| 2014/0172253 A1 | 6/2014 | Palmer |
| 2014/0214311 A1 | 7/2014 | Stevens et al. |
| 2014/0257669 A1 | 9/2014 | Wu et al. |
| 2015/0266466 A1 * | 9/2015 | Johri .................... B60W 10/06 701/22 |

* cited by examiner

VEHICLE CONTROLS INCLUDING DYNAMIC VEHICLE PARAMETER DETERMINATION

BACKGROUND

The present application relates generally to vehicle controls including dynamic vehicle parameter determination. Traditionally, vehicle controls have used constant calibratible values for parameters relating to vehicle losses such as power loss due to aerodynamic drag, power loss due to rolling resistance, power loss due to powertrain losses and others. Some attempts have been made to provide dynamic determination of such vehicle parameters, however, existing efforts suffer from a number of shortcomings including those respecting complexity, computational burden and reliability, among other drawbacks. There remains a significant need for the unique apparatuses, methods, systems, and controls disclosed herein.

DISCLOSURE OF ILLUSTRATIVE EMBODIMENTS

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique method of operating a vehicle system including a powertrain comprising a prime mover structured to propel the vehicle, and an electronic control system in operative communication with the prime mover and the transmission. The method includes estimating a plurality of coefficients of a vehicle loss model, evaluating a convergence criterion for the plurality of estimated coefficients, setting converged values of the plurality of coefficients if the convergence criterion is satisfied, determining a vehicle powertrain command utilizing the converged values of the plurality of coefficients, and transmitting a vehicle powertrain command to control operation of one or more powertrain components. Further embodiments, forms, objects, features, advantages, aspects, and benefits shall become apparent from the following description and drawings.

DETAILED DESCRIPTION OF ILLUSTRATIVE EMBODIMENTS

Figure 1:
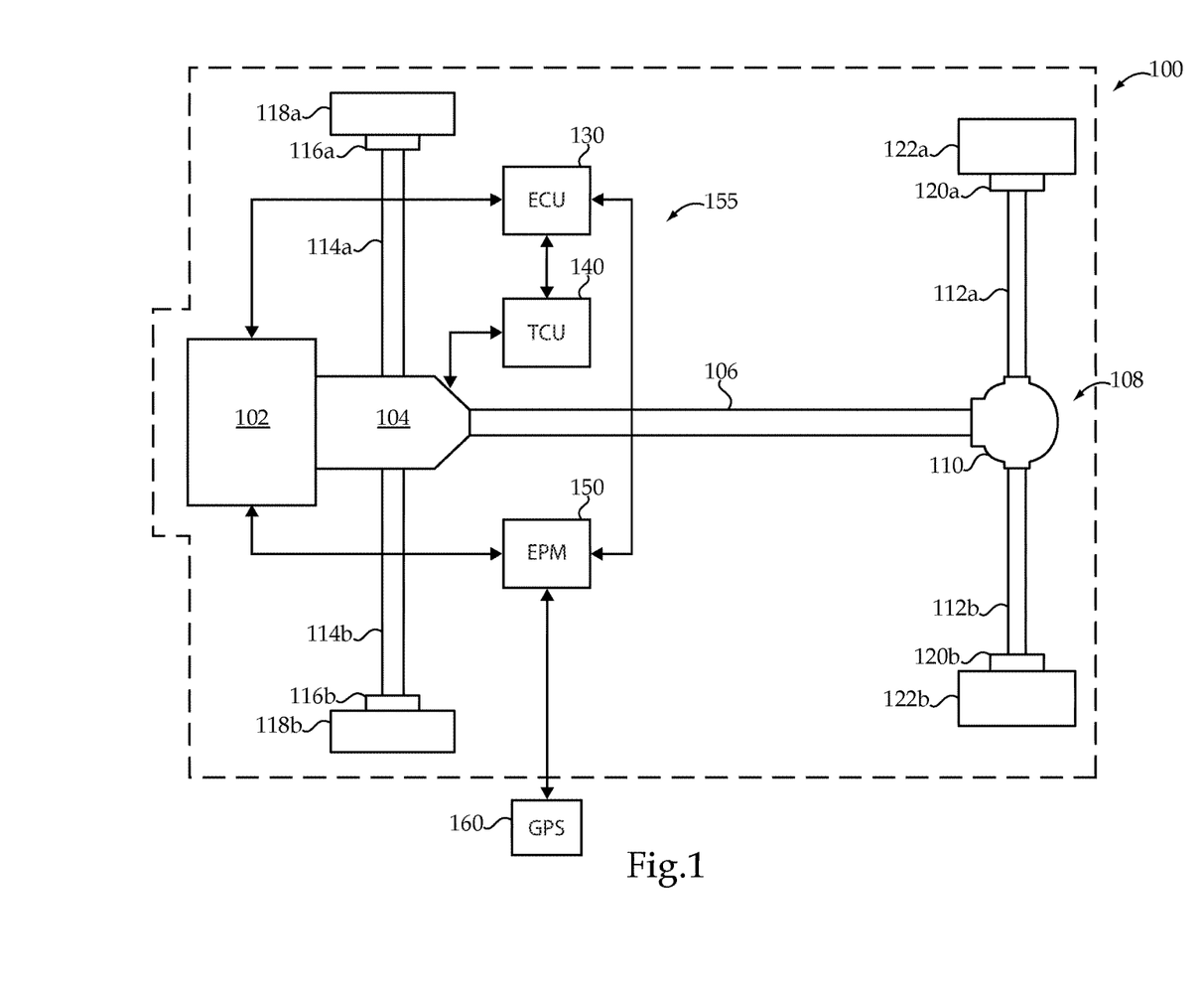
FIG. 1 is a schematic diagram illustrating an exemplary vehicle system.

With reference to FIG. 1 there is illustrated a schematic view of an exemplary vehicle system 100 including a prime mover structured to provide motive power for the vehicle system 100. In the illustrated embodiment the prime mover is structured as an internal combustion engine 102. In other embodiments the prime mover may be structured differently, for example, as a hybrid electric prime mover including an engine and one or more electric machines, as a pneumatic hybrid prime mover including an engine and one or more pneumatic systems, or as a purely electric prime mover including one or more electric machines. It shall be understood that the description referring to engine 102 is also applicable to these and other types of prime movers. The vehicle system 100 further includes a transmission 104 operably connected to the engine 102 for receiving the output torque of the engine 102 and transmitting the output torque to a drive shaft 106. The vehicle system 100 illustrated in FIG. 1 is structured in a rear wheel drive configuration including a final drive 108 having a rear differential 110 connecting the drive shaft 106 to rear axles 112*a* and 112*b*. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle.

In the illustrated embodiment, vehicle system 100 further includes two front brakes 116*a* and 116*b*, each positioned between and operably connected to two front wheels 118*a* and 118*b* and front axles 114*a* and 114*b*, respectively. Vehicle system 100 further includes two rear brakes 120*a* and 120*b*, each positioned between two rear wheels 122*a* and 122*b* and rear axles 112*a* and 112*b*, respectively. It is contemplated that vehicle system 100 may have more or fewer tires and/or brakes than illustrated in FIG. 1. In certain embodiments, vehicle system 100 may also include various components not shown, such as a fuel system including a fuel tank, a braking system, an engine intake system, and an engine exhaust system, which may include an exhaust aftertreatment system, to name a few examples.

Vehicle system 100 includes an engine control unit (ECU) 130, sometimes referred to as an engine control module (ECM), or the like, which is directed to regulating and controlling the operation of engine 102. System 100 further includes a transmission control unit (TCU) 140 which is directed to the regulation and control of transmission 104. ECU 130 and TCU 140 are each in electrical communication with one another as well as with a plurality of sensors, actuators, and additional components of vehicle system 100 via controller area network (CAN) 155. ECU 130 and TCU 140 may be structured to receive a variety of operational information relating to vehicle system 100 including, for example, engine speed, transmission speed, engine torque, engine power, gear selection, accelerator position, brake pedal position, ambient temperature, turbocharger boost pressure, intake manifold pressure, intake manifold temperature, exhaust manifold pressure, exhaust manifold temperature, local horizon prediction information, inclinometer information, and GPS or telematics information. The foregoing information may be provided by physical sensors, virtual sensors or combinations thereof.

In certain embodiments, the ECU 130 and the TCU 140 may be combined into a single control module, commonly referred to as a powertrain control module (PCM) or powertrain control unit (PCU), or the like. It is contemplated that ECU 130 may be integrated within the engine 102 and/or TCU 140 may be integrated within transmission 104. Other various electronic control units for vehicle subsystems may be present in vehicle system 100, such as a braking system electronic control unit and a cruise control electronic control unit, for example, but such other various electronic control units for vehicle subsystems are not show in vehicle system 100 to preserve clarity.

Vehicle system 100 further includes an engine power management (EPM) controller 150 operably connected to the ECU 130 for receiving vehicle system 100 sensor data and conditions. EPM controller 150, which may be dedicated to some or all of the controls and processes disclosed in further detail below as well as to additional control for the regulation and control of the engine in vehicle system 100. In the illustrated embodiment, EPM controller 150 is in electrical communication with the ECU 130. It is contemplated that in certain embodiments EPM controller may be in electrical communication with TCU 140. In certain embodiments, a portion of the EPM controller 150 or the entire EPM controller may be integrated within the ECU 130 and/or TCU 140. EPM controller 150 may further be in electrical communication with one or more of the plurality of vehicle sensors in vehicle system 100 for receiving and transmitting conditions of vehicle system 100, such as temperature and pressure conditions, for example.

In the exemplary embodiment illustrated in FIG. 1, a navigation and positioning system 160, such as a global position system (GPS) device mounted external to vehicle system 100 and/or an electronic horizon device connected to vehicle system 100, may be electronically connected to EPM controller 150 for the purpose of providing future route grade information as well as other look ahead or forecast information. In certain embodiments, additional information from the navigation and positioning system 160 may be transmitted to the EPM controller 150, such as traffic, elevation, and/or weather conditions, for example. It is contemplated that in certain embodiments, specifically where a navigation and positioning system 160 is not connected to EPM controller 150, that route grade information may be programmed into memory and accessed by the EPM controller 150 while the vehicle is travelling along the travel route.

It is contemplated that the controls, control systems, and control devices disclosed herein may be utilized in connection with intelligent transport systems and services (ITS) which comprises systems that integrate information and communication technologies with transport infrastructure to improve economic performance, safety, mobility and environmental sustainability. An exemplary ITS system includes three operational layers: a data collection layer, a data aggregation and translation layer and an information dissemination layer.

The data collection layer may include EPM controller 150 and system 160 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspect, the received data may include information about road grade, speed limits, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include EPM controller 150 and system 160 as well as devices and systems on a plurality of vehicles which receive information transmitted from the data aggregation and translation layer. The received information may include road grade information, information about traffic speed over a given segment of roadway, information about speed limits, as well as information about weather conditions such as wind speed, precipitation and road conditions may be derived. As further described below, ITS information from one or more of the foregoing layers may be utilized in connection with the controls, control systems, and control devices disclosed herein.

It is contemplated that at least a portion of the conditions and/or measured inputs required for interpreting signals by the EPM controller 150 may be received from ECU 130 and/or TCU 140, in addition to or alternatively to the plurality of vehicle sensors. It is further contemplated that in certain embodiments ECU 130, TCU 140, and EPM controller 150 may transmit data communication messages across a CAN 155. ECU 130, TCU 140 and EPM 150, comprise components of an exemplary electronic control system. Various other electronic control system configurations are also contemplated.

Electronic control systems implementing the controls disclosed herein may utilize received data and signal inputs, stored data values, constants, and functions, as well as computer executable operating instructions stored on one or more non-transitory computer readable media. The control operations and processes disclosed herein may be performed at least in part by EPM 150, TCU 140, ECU 130, or combinations thereof as well as in other controllers and control units or combinations including the same. The illustrated controls and control processes are understood to be exemplary only, and operations may be combined or divided, and added or removed, as well as re-ordered in whole or part, unless stated explicitly to the contrary herein.

Figure 2:
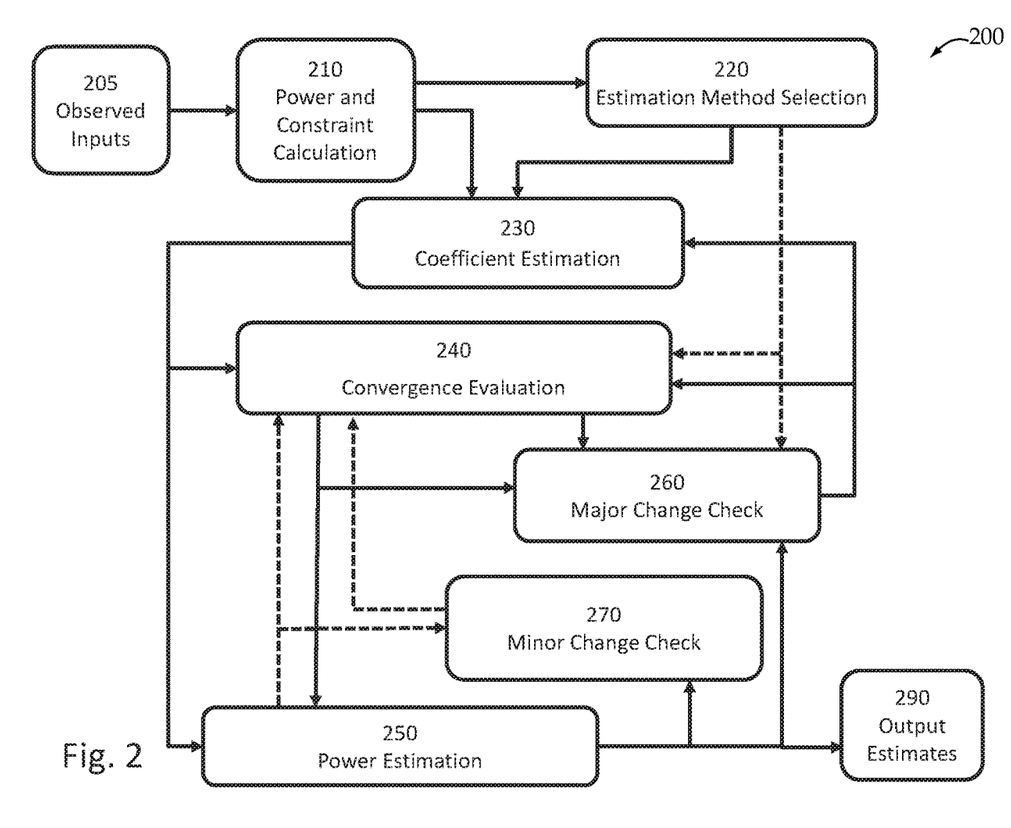
FIG. 2 is a schematic block diagram illustrating exemplary controls for a vehicle system.

With reference to FIG. 2 there is illustrated a schematic block diagram of exemplary controls 200. Controls 200 may be implemented in one or more electronic control units of an electronic control system. For example, controls 200 may be implemented in ECU 130, TCU 140, EPM controller 150 or a combination thereof.

Controls 200 include power and constraint determination block 210 which is structured to determine vehicle power parameters based and evaluate conditions for enabling or disabling the operation of controls 200. Block 210 is structured to receive a plurality of observed input parameters 205. In the illustrated embodiment, the observed input parameters 205 include engine output torque ($\tau$), engine speed ($\omega$), vehicle mass (m), road grade ($\theta$), vehicle velocity (u), and vehicle acceleration (a). Gravitational acceleration parameter (g) is also known to block 210. Block 210 utilizes these observed input parameters to determine engine output power ($P_{eng}$ Out), power needed to overcome the force of gravity ($P_{gravity}$), and power needed for observed vehicle acceleration ($P_{accl}$). These power parameters may be determined in accordance with the equations (1)-(3) below.

$$P_{eng\ out} = \tau \cdot \omega \quad (1)$$

$$P_{gravity} = m \cdot g \cdot \sin(\theta) \cdot u \quad (2)$$

$$P_{accl} = m \cdot a \cdot u \quad (3)$$

Block 210 is also structured to evaluate conditions for enabling or disabling the operation of controls 200. In one non-limiting example, block 210 is structured to enable controls 200 if it determines there is no braking event, there is no gear shifting event, engine output torque meets or exceeds a threshold, vehicle speed meets or exceeds a threshold, and one or more of the observed input parameters meets a rationality criterion, and to disable controls 200 if any of these criteria are not met. It shall be appreciated that a variety of additional or alternate constraints on the operation of controls 200 may also be utilized.

Block 210 provides an enable/disable flag to estimation type block 220 and estimation block 230. Estimation type block 220 determines whether model coefficient estimation is performed in terms of vehicle power or, alternatively, in terms of vehicle energy. It shall be appreciated that block 220 may be omitted in embodiments in which either vehicle power or vehicle energy is utilized exclusively as the basis for model coefficient estimation. Block 220 provides a flag indicating whether vehicle power or vehicle energy estimation is to be used to block 230. Block 220 also provides the determined power parameters to convergence check block 240 and major change check block 260.

The operation of estimation block 230 shall first be descried in a form utilizing vehicle power parameters and the modifications to the operation of estimation block 230 in a form utilizing vehicle energy parameters shall then be described. Block 230 is structured to utilize a predetermined relationship between total vehicle power loss ($P_{loss\ total}$) and the observation-determined vehicle power parameters ($P_{eng\ out}$, $P_{gravity}$, and $P_{accl}$) which is described by equation (4) below.

$$P_{eng\ out} - P_{Gravity} - P_{Accl} = P_{loss\ total} \quad (4)$$

It shall be appreciated that the total vehicle power loss is a single term accounting for multiple losses experienced during operation of a vehicle including power loss due to aerodynamic drag, power loss due to wheel drag, and post-engine powertrain losses. It shall be further appreciated that pre-engine output losses are accounted for by utilizing the engine output power term.

Block 230 is structured to include a vehicle loss model correlating total vehicle power loss as a dependent variable with vehicle speed as an independent variable. It shall be appreciated that the vehicle loss model may correlate total vehicle power loss as the sole dependent variable with vehicle speed as the sole independent variable. In certain forms the vehicle loss model may be structured as a polynomial of second order or higher, for example, as represented by equation (5) below which includes coefficients $a_0$, $a_1$, $a_2$, ... $a_n$, and vehicle velocity (u).

$$a_0 + a_1 \cdot u + a_2 \cdot u^2 + \ldots + a_n \cdot u^n; n \geq 2 \quad (5)$$

In certain forms the vehicle loss model may be a structured as a power series, or in other forms which correlate total vehicle power loss as a dependent variable with vehicle speed as an independent variable. It shall be appreciated that vehicle loss model may be predetermined and the estimation performed by block 230 may be simplified to estimation of coefficients of the vehicle loss model.

Block 230 may be structured to estimate a plurality of coefficients of the vehicle power loss model utilizing the observation-determined vehicle power parameters ($P_{eng\ out}$, $P_{gravity}$, and $P_{accl}$) to provide an observed power value against which coefficient estimations may be performed. The particular coefficient estimation technique may take a number of forms including, for example, recursive least squares (RLS) techniques, RLS techniques including a forgetting factor, Kalman filter techniques, Kalman filter techniques with a forgetting factor, and extended Kalman filter techniques to name several examples. These or other estimation techniques may be utilized to solve a coefficient estimation problem using observation-determined vehicle power parameters. In one non-limiting example the coefficient optimization problem may utilize a second order polynomial-based model expressed in accordance with equation (6) below, it being appreciated that the other model forms described herein may also be utilized.

$$(\tau \cdot \omega) - (m \cdot g \cdot \sin(\theta) \cdot u) - (m \cdot a \cdot u) \approx a_1 \cdot u + a_2 \cdot u^2 \quad (6)$$

The estimation operation of block 230 is preferably adaptive in nature such that it is operable to repeatedly (e.g., repeating two or more times) find current coefficients accounting for changing operating conditions and thus utilizes current incoming data for online learning. The estimation operation of block 230 may operate in an alive state in which the estimation operation is executed and model coefficients are estimated using online learning. The alive state may be set when the enable flag is set to enable operation of controls 200. In the alive state, block 230 provides the current coefficient determined by the estimation operation to convergence check block 240 and power estimation block 250. Block 230 may also assume a frozen state in which the estimation operation is not performed and the model coefficients are held constant at the last value determined during the most recent alive state and are provided to blocks 240 and 250.

Block 230 may also be structured to perform operation estimations in terms of vehicle energy rather than vehicle power. By integrating both sides of equation (6) above over a time interval ($T_0$-$T_k$) and using an equivalent vehicle mass term ($m_{eq}$) a coefficient optimization problem can be expressed in terms of vehicle energy in accordance with equation (7) below and may be solved using any of the aforementioned techniques.

$$\int_{T_0}^{T_k} \tau \cdot \omega \cdot dt - \frac{1}{2} m_{eq} \cdot [u_k^2 - u_0^2] - g \cdot \int_{T_0}^{T_k} m_{eq} \cdot \sin\theta \cdot u \cdot dt = \\ a_1 \int_{T_0}^{T_k} u \cdot dt + a_2 \int_{T_0}^{T_k} u^2 \cdot dt \quad (7)$$

It shall be appreciated that performing an optimization in terms of vehicle energy may eliminate the use of observation-determined parameters that rely on or include vehicle acceleration terms. This may be preferred in situations where vehicle acceleration is too noisy or otherwise likely to introduce an unacceptable level of error into a coefficient estimation.

Convergence check block 240 is structured to receive estimated coefficients from estimation block 230 and to evaluate whether the coefficients have converged using one or more convergence criteria. Convergence block 240 is structured to identify suitable and stable coefficients which meet the estimation accuracy criteria set by other control features. The coefficients identified by block 240 may be referred to as converged coefficients.

In certain embodiments, convergence check block 240 may be structured to evaluate variation in coefficients. Once coefficients that satisfy a predetermined variation criterion are identified, they may be latched and broadcast, transmitted to or otherwise utilized by other control features. In one non-limiting example, coefficient variation may be evaluated as illustrated in connection with FIG. 3 which shows a sequence of estimated coefficient values 302 over time, a coefficient difference threshold 310 (the area bounded by lines 304 and 306) and a time duration threshold 320. If the difference between a current coefficient value and the last estimated coefficient value along sequence 302 is less than coefficient difference threshold 310 over time duration threshold 320, then convergence is deemed to have occurred. A timer may be used to track progress against time duration threshold 320 and may be reset if the difference between coefficients is not less than threshold 310 or if a reset signal is received from another block such as major change block 260. The values of thresholds 310 and 320 may be based upon drive cycle, vehicle type or other criteria.

Figure 3:
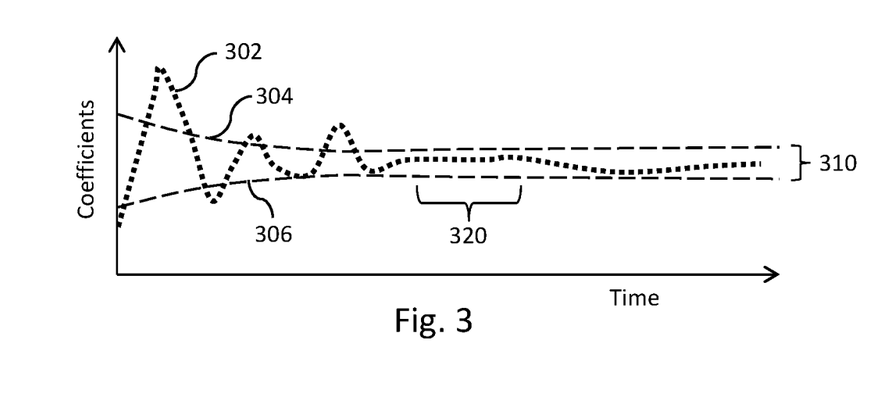
FIG. 3 is a graph illustrating an exemplary convergence evaluation technique.

In the foregoing example, block 240 sets the value of a convergence status flag based upon its evaluation. The convergence flag is set to a "no convergence" value if the difference between the current and previous coefficient estimates is greater than threshold 310. The flag is set to an "in convergence" value if the difference between the current and previous coefficient estimates is less than threshold 310 and the timer has not yet reached time duration threshold 320. The flag is set to a "converged" value if the difference between the current and previous coefficient estimates is less than threshold 310 and the timer has reached time duration threshold 320.

Figure 4:
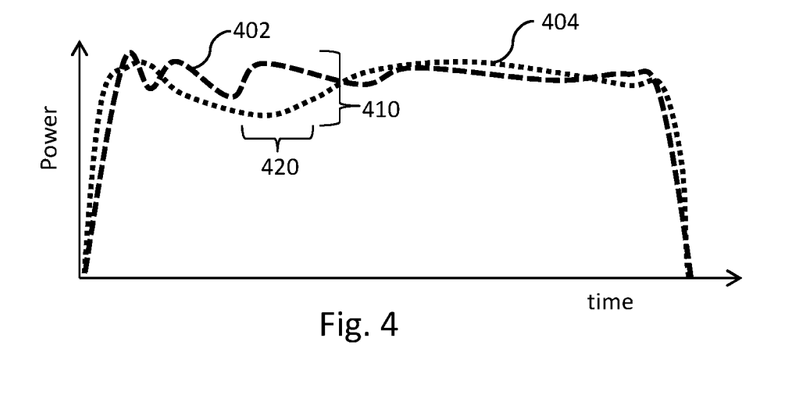
FIG. 4 is a graph illustrating an exemplary convergence evaluation technique.

In another non-limiting example, coefficient variation may be evaluated as illustrated in connection with FIG. 4 which shows a sequence of observed power values 402 and a sequence of estimated power values 404 over time, a power difference threshold 410 and a time duration threshold 420. If the difference between observed power and estimated power is less than threshold 410 over time duration threshold 420, then convergence is deemed to have occurred. A timer may be used to track progress against time duration threshold 420 and may be reset if the difference between observed power and estimated power is not less than threshold 410 or if a reset signal is received from another block such as major change block 260. The values of thresholds 410 and 420 may be based upon a percent error acceptance value which may be independent from factors such as drive cycle and vehicle type.

In the foregoing example, block 240 sets the value of a convergence status flag based upon its evaluation. The convergence flag is set to a "no convergence" value if the difference between observed power and estimated power is greater than threshold 410. The flag is set to an "in convergence" value if the difference between the observed power and estimated power is less than threshold 410 and the timer has not yet reached time duration threshold 420. The flag is set to a "converged" value if the observed power and estimated power is less than threshold 410 and the timer has reached time duration threshold 420.

Block 240 outputs the value of the convergence flag to major change check block 260. Once converged coefficients are identified, block 240 outputs them to power estimation block 250 and major change check block 260. Even after converged coefficients are identified, it may be desirable that they be re-determined and updated if there is a sufficiently significant change in the power loss of vehicle. Change in power loss values can come due to change in properties such as aero drag, wind change, air density, rolling resistance due to road surface conditions and other factors. Major change check block 260 is structured to detect such conditions and reset estimation block 230 and convergence evaluation block 240 to identify new estimated coefficients starting from a reset state for block 230 and evaluate convergence of the new estimated coefficients from a reset state for block 240 to identify new converged coefficients.

Power estimation block 250 may be structured to determine estimates of current engine power and current total power loss using the current coefficients provided by block 230 and also to determine estimates of converged engine power and converged total power loss using the converged coefficients identified by block 240. Block 250 provides the estimated current total power loss to blocks 240 and 270, provides the estimated converged total power loss to blocks 260 and 270, and provides the estimated converged engine power and estimated converged total power loss to block 290. Block 290 may, in turn, provide the estimated converged engine power and estimated converged total power loss to one or more additional control system components that are structured to determine vehicle powertrain commands using one or both parameters. Such commands may include commands for one or more of an engine speed, an engine torque, and a transmission shift event. In certain forms estimates based on current coefficients may additionally or alternatively be provided to and utilized by block 290.

Block 250 may also be structured to predict future engine power using estimated power loss parameters. In one non-limiting example, block 250 may acquire look ahead or forecast information from other systems or components such as the navigation and positioning system and components and/or the ITS-related systems and components described herein. Such information may include future vehicle speed, future vehicle acceleration, and future road grade. Total future engine power ($P_{eng\ out\ (future)}$) can then be predicted in accordance with equations (8) and (9) below in which the subscript "i" denotes look ahead data.

$$P_{Propulsion} = P_{eng\ out\ (estimated)} = P_{Gravity} + P_{Accl} + P_{Loss\ estimate} \quad (8)$$

$$P_{eng\ out\ (future)} = m \cdot g \cdot \sin \theta_i u_i + m \cdot a_i \cdot u_i + (a_1 \cdot u_i + a_2 \cdot u_i^2) \quad (9)$$

Total future engine power may be utilized to determine commands to control operation of one or more powertrain components. Such commands may include engine speed commands, engine torque commands, and transmission shift commands, among others. These and other commands may provide optimized powertrain operation in advance of or concurrent with future operating conditions, rather than responding to changes in operating conditions as they occur. For example, future road grade information may be utilized in determining total future engine power for a hill climbing event and a hill descent event. By accounting for variation in future engine power associated with these events, engine and transmission commands may be optimized. Similarly, information from an ITS system about future traffic speed or future speed limits which may limit future vehicle speed may be utilized in determining total future engine power and optimized engine and transmission commands associated with the same.

In one non-limiting example future engine power can be utilized to provide engine estimation error compensation. In a given vehicle system there exist various types of errors in sensors used for computing observed power such as vehicle speed sensor, mass estimation, engine speed, and others. Such errors can lead to incorrect loss power estimation and incorrect engine power estimation (both, current and future). An error between current true engine power and estimated engine power determined by block 250 may be utilizes as a feedback to correct the estimation of coefficients. Threshold bounds may be used as constraints to define a correction update condition when estimated engine power exceeds max or min true engine power capability. This compensation technique can be utilized to overcome errors in sensor.

Figure 5:
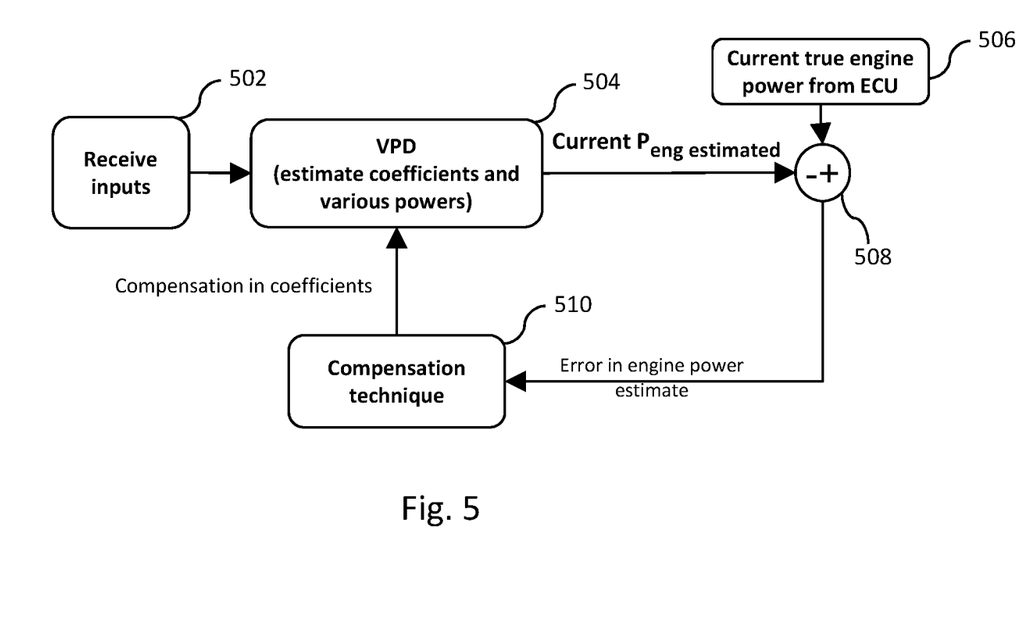
FIG. 5 is a schematic block diagram illustrating exemplary controls for a vehicle system.

FIG. 5 illustrates one non-limiting example of controls 500 utilizing an error-correcting feedback technique. In controls 500 inputs such as those described above are provided by block 502 to block 504 which performs a coefficient estimation and power determination in accordance with the techniques described above. Block 504 outputs a current estimated engine power ($P_{eng\ estimated}$) to error operator 508 which also receives an input from block 506 representing a current value of true engine power from an engine control unit. Operator 508 determines an error between its two inputs and provides the error to block 510 which utilizes a compensation technique to reduce error in coefficient estimation and provides information for coefficient compensation to block 504.

With continuing reference to FIG. 2, major change block 260 may utilize a number of techniques to identify whether a major change has occurred. In certain embodiments, block 260 utilizes a technique in which estimated model coefficients are monitored for their variations. If coefficient variation is determined to meet a variation criterion, a major change event is flagged. In one non-limiting example, coefficient variation is found in following manner. If the difference between a current coefficient and a last estimated coefficient is greater than a major change threshold for a duration greater than a major change time threshold, then a major change flag is set to true.

In certain embodiments, block 260 utilizes a technique in which variation in observed power and estimated power is evaluated. If variation between observed power and estimated power is determined to meet a variation criterion, a major change event is flagged. In one non-limiting example, coefficient variation is found in following manner. If the difference between a observed power and estimated power is greater than a major change threshold for a duration greater than a major change time threshold, then a major change flag is set to true.

If major change block 260 identifies a major change, the resulting output causes estimation block 230 and convergence evaluation block 240 to reset and identify updated converged coefficients. In this event the blocks 230 and 240 may repeat the operations described above from a reset starting point.

Controls 200 also include minor change block 270. As the converged coefficients are calculated, a constant bias may exist between the converged power and the current power. This bias may be utilized as an improvement possibility indicator for the converged power. Minor change check block 270 is structured to evaluate if a bias error between converged and current power is within an error band for a specific amount of time. The size of the error band and the duration may be selected to provide minimum error between converged and current power. Once a minor change is detected, block 270 resets the convergence evaluation block 240 to identify new converged coefficients, but does not reset coefficient estimation block 230.

In one non-limiting example, block 270 detects a minor change in the following manner. An absolute difference (E) is calculated between current power loss and converged power loss, for example, in accordance with equation (10) below. If the difference is between a high and low threshold then the difference is integrated, for example, in accordance with equation (11) below. A minor change is identified when the integration output (Y) exceeds a third threshold. If the difference reduces below low threshold or increases above high threshold the integrator state and output are set to zero.

$$E = |P_{loss(Current)} - P_{loss(Converged)}| \quad (10)$$

$$Y = \int E dt \quad (11)$$

A number of further exemplary embodiments shall now be described. One embodiment is a method comprising operating a vehicle system including a powertrain comprising a prime mover and an electronic control system in operative communication with the powertrain, the electronic control system being structured to perform the acts of: repeatedly estimating a plurality of coefficients of a vehicle loss model, the vehicle loss model being structured to describe a total loss of power or energy attributable to operation of the powertrain to propel the vehicle; evaluating a convergence criterion for the plurality of estimated coefficients; setting converged values of the plurality of coefficients if the convergence criterion is satisfied; determining a vehicle powertrain command utilizing the converged values of the plurality of coefficients; transmitting the vehicle powertrain command to control operation of one or more powertrain components; evaluating a reset condition using one of a variation between the repeatedly estimated coefficients and a variation between a power or energy value determined using the converged coefficients and a power or energy value determined using information observed during operation of the vehicle; and if the reset condition is satisfied, repeating from a reset starting point the acts of repeatedly estimating a plurality of coefficients, evaluating a convergence criterion, setting converged values, determining a vehicle powertrain command, and transmitting the vehicle powertrain command.

In certain forms of the foregoing embodiment the act of determining the vehicle powertrain command utilizes a predicted future engine power determined utilizing the converged values of the plurality of coefficients. Certain forms comprise evaluating a second reset condition using variation between a power value determined using current estimated coefficients and a power value determined using converged estimated coefficients; and repeating the act evaluating a convergence criterion from a reset starting point if the second reset condition is satisfied. In certain forms the vehicle powertrain command controls one or more of a prime mover speed and a prime mover torque. In certain forms the act of evaluating the convergence criterion includes evaluating variation between a current coefficient estimate and a prior coefficient estimate relative to a variation criterion. In certain forms the act of evaluating the convergence criterion includes evaluating a difference between an observed power and an estimated power relative to a power difference criterion.

Another embodiment is a method comprising: operating a powertrain including a prime mover structured to propel a vehicle; and operating an electronic control system in operative communication with the powertrain to perform the acts of: estimating a plurality of coefficients of a vehicle loss model, the vehicle loss model being structured to describe a total loss of power or energy attributable to operation of the powertrain to propel the vehicle, identifying converged values for the coefficients, predicting a future prime mover power utilizing the converged values of the plurality of coefficients and values for one or more future conditions predicted to be encountered by the vehicle, and controlling operation of one or more powertrain components utilizing the predicted future prime mover power.

In certain forms of the foregoing embodiment the predicted future conditions include predicted future road grade and predicted future vehicle velocity. In certain forms the predicted future conditions are determined using information received from an intelligent transportation system external to the vehicle. In certain forms the predicted future engine power is utilized in correcting error in estimating the plurality of coefficients. In certain forms predicted future engine power is utilized to change operation of the prime mover in anticipation of one or more of a change in vehicle velocity, a change in road grade, and a change in vehicle acceleration. Certain forms comprise evaluating a reset condition using one of a variation between the repeatedly estimated coefficients and a variation between a power or energy value determined using the converged coefficients and a power or energy value determined using information observed during operation of the vehicle; and repeating the acts of repeatedly estimating a plurality of coefficients and identifying converged values from a reset starting point if the reset condition is satisfied. Certain forms comprise: evaluating a reset condition using variation between a power value determined using current estimated coefficients and a power value determined using converged estimated coefficients; and repeating the act identifying converged values from a reset starting point if the reset condition is satisfied.

A further embodiment is a vehicle comprising: a prime mover structured to propel the vehicle; and an electronic control system in operative communication with the prime mover, the electronic control system being structured to: repeatedly estimate a plurality of coefficients of a vehicle loss model, the vehicle loss model being structured to describe a total loss of power or energy during operation of the prime mover to propel the vehicle, identify converged values for the plurality of coefficients using a convergence criterion, predict a future prime mover power utilizing the converged values of the plurality of coefficients and values for one or more future conditions predicted to be encountered by the vehicle, and control operation of the prime mover utilizing the predicted future prime mover power.

In certain forms of the foregoing embodiment the predicted future conditions include predicted future road grade and predicted future vehicle velocity. In certain forms the predicted future conditions are determined using information received from an intelligent transportation system external to the vehicle. In certain forms the predicted future engine power is utilized to correct error in estimating the plurality of coefficients. In certain forms the predicted future engine power is utilized to change operation of the prime mover in advance of one of a change in vehicle velocity, a change in road grade, and a change in vehicle acceleration. In certain forms the electronic control system is structured to evaluate a reset condition using one of a variation between the repeatedly estimated coefficients and a variation between a power or energy value determined using the converged coefficients and a power or energy value determined using information observed during operation of the vehicle, and re-estimate the plurality of coefficients and re-identify the converged values from a reset starting point if the reset condition is satisfied. In certain forms the electronic control system is structured to evaluate a reset condition using variation between a power value determined using current estimated coefficients and a power value determined using converged estimated coefficients, and re-identify the converged values from a reset starting point if the reset condition is satisfied.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
   operating a vehicle system including a powertrain comprising a prime mover and an electronic control system in operative communication with the powertrain, the electronic control system being structured to perform the acts of:
   repeatedly estimating a plurality of coefficients of a vehicle loss model, the vehicle loss model being structured to describe a total loss of power or energy attributable to operation of the powertrain to propel the vehicle;
   evaluating a convergence criterion for the plurality of estimated coefficients;
   setting converged values of the plurality of coefficients if the convergence criterion is satisfied;
   determining a vehicle powertrain command utilizing the converged values of the plurality of coefficients;
   transmitting the vehicle powertrain command to control operation of one or more powertrain components;
   evaluating a reset condition using one of a variation between the repeatedly estimated coefficients and a variation between a power or energy value determined using the converged coefficients and a power or energy value determined using information observed during operation of the vehicle; and
   if the reset condition is satisfied, repeating from a reset starting point the acts of repeatedly estimating a plurality of coefficients, evaluating a convergence criterion, setting converged values, determining a vehicle powertrain command, and transmitting the vehicle powertrain command.

2. The method of claim 1 wherein the act of determining the vehicle powertrain command utilizes a predicted future engine power determined utilizing the converged values of the plurality of coefficients.

3. The method of claim 1 comprising:
   evaluating a second reset condition using variation between a power value determined using current estimated coefficients and a power value determined using converged estimated coefficients; and repeating the act evaluating a convergence criterion from a reset starting point if the second reset condition is satisfied.

4. The method of claim 1 wherein the vehicle powertrain command controls one or more of a prime mover speed and a prime mover torque.

5. The method of claim 1 wherein the act of evaluating the convergence criterion includes evaluating variation between a current coefficient estimate and a prior coefficient estimate relative to a variation criterion.

6. The method of claim 1 wherein the act of evaluating the convergence criterion includes evaluating a difference between an observed power and an estimated power relative to a power difference criterion.

7. A method comprising:
operating a powertrain including a prime mover structured to propel a vehicle; and
operating an electronic control system in operative communication with the powertrain to perform the acts of:
estimating a plurality of coefficients of a vehicle loss model, the vehicle loss model being structured to describe a total loss of power or energy attributable to operation of the powertrain to propel the vehicle,
identifying converged values for the coefficients,
predicting a future prime mover power utilizing the converged values of the plurality of coefficients and values for one or more future conditions predicted to be encountered by the vehicle, and
controlling operation of one or more powertrain components utilizing the predicted future prime mover power.

8. The method of claim 7 wherein the predicted future conditions include predicted future road grade and predicted future vehicle velocity.

9. The method of claim 7 wherein the predicted future conditions are determined using information received from an intelligent transportation system external to the vehicle.

10. The method of claim 7 wherein the predicted future engine power is utilized in correcting error in estimating the plurality of coefficients.

11. The method of claim 7 wherein the predicted future engine power is utilized to change operation of the prime mover in anticipation of one or more of a change in vehicle velocity, a change in road grade, and a change in vehicle acceleration.

12. The method of claim 7 comprising:
evaluating a reset condition using one of a variation between the repeatedly estimated coefficients and a variation between a power or energy value determined using the converged coefficients and a power or energy value determined using information observed during operation of the vehicle; and
repeating the acts of repeatedly estimating a plurality of coefficients and identifying converged values from a reset starting point if the reset condition is satisfied.

13. The method of claim 7 comprising:
evaluating a reset condition using variation between a power value determined using current estimated coefficients and a power value determined using converged estimated coefficients; and
repeating the act identifying converged values from a reset starting point if the reset condition is satisfied.

14. A vehicle comprising:
a prime mover structured to propel the vehicle; and
an electronic control system in operative communication with the prime mover, the electronic control system being structured to:
repeatedly estimate a plurality of coefficients of a vehicle loss model, the vehicle loss model being structured to describe a total loss of power or energy during operation of the prime mover to propel the vehicle,
identify converged values for the plurality of coefficients using a convergence criterion,
predict a future prime mover power utilizing the converged values of the plurality of coefficients and values for one or more future conditions predicted to be encountered by the vehicle, and
control operation of the prime mover utilizing the predicted future prime mover power.

15. The vehicle of claim 14 wherein the predicted future conditions include predicted future road grade and predicted future vehicle velocity.

16. The vehicle of claim 14 wherein the predicted future conditions are determined using information received from an intelligent transportation system external to the vehicle.

17. The vehicle of claim 14 wherein the predicted future engine power is utilized to correct error in estimating the plurality of coefficients.

18. The vehicle of claim 14 wherein the predicted future engine power is utilized to change operation of the prime mover in advance of one of a change in vehicle velocity, a change in road grade, and a change in vehicle acceleration.

19. The vehicle of claim 14 wherein the electronic control system is structured to evaluate a reset condition using one of a variation between the repeatedly estimated coefficients and a variation between a power or energy value determined using the converged coefficients and a power or energy value determined using information observed during operation of the vehicle, and re-estimate the plurality of coefficients and re-identify the converged values from a reset starting point if the reset condition is satisfied.

20. The vehicle of claim 14 wherein the electronic control system is structured to evaluate a reset condition using variation between a power value determined using current estimated coefficients and a power value determined using converged estimated coefficients, and re-identify the converged values from a reset starting point if the reset condition is satisfied.

\* \* \* \* \*